United States Patent
Sundahl et al.

(10) Patent No.: US 11,372,969 B1
(45) Date of Patent: Jun. 28, 2022

(54) RANDOMIZED CANARY AND SHADOW STACK FOR JIT-ROP DEFENSE

(71) Applicant: Polyverse Corporation, Bellevue, WA (US)

(72) Inventors: Roy Sundahl, Kirkland, WA (US); Don McCrady, Redmond, WA (US); Michael Collison, Charlotte, NC (US)

(73) Assignee: Polyverse Corporation, Bellevue, WA (US)

( * ) Notice: Subject to any disclaimer, the term of this patent is extended or adjusted under 35 U.S.C. 154(b) by 0 days.

(21) Appl. No.: 17/478,653

(22) Filed: Sep. 17, 2021

(51) Int. Cl.
*G06F 21/54* (2013.01)
*G06F 21/60* (2013.01)
*G06F 21/57* (2013.01)
*G06F 21/55* (2013.01)

(52) U.S. Cl.
CPC ............ *G06F 21/54* (2013.01); *G06F 21/554* (2013.01); *G06F 21/577* (2013.01); *G06F 21/602* (2013.01)

(58) Field of Classification Search
CPC ...... G06F 21/54; G06F 21/554; G06F 21/577; G06F 21/602
See application file for complete search history.

(56) References Cited

U.S. PATENT DOCUMENTS

| | | | | |
|---|---|---|---|---|
| 10,496,462 | B2* | 12/2019 | Gschwind | G06F 21/54 |
| 11,188,470 | B2* | 11/2021 | Peles | G06F 21/52 |
| 2007/0022058 | A1* | 1/2007 | Labrou | G06Q 20/401 705/67 |
| 2016/0104009 | A1* | 4/2016 | Henry | G06F 9/30189 713/190 |
| 2016/0224784 | A1* | 8/2016 | Krishnaswamy | G06F 21/52 |
| 2019/0108085 | A1* | 4/2019 | Gschwind | G06F 11/073 |
| 2019/0286448 | A1* | 9/2019 | Shreve | G06F 9/30145 |
| 2020/0026665 | A1* | 1/2020 | Sethumadhavan | G06F 21/64 |
| 2020/0082070 | A1* | 3/2020 | Semeria | G06F 9/45516 |
| 2020/0125770 | A1* | 4/2020 | LeMay | G06F 12/0207 |
| 2020/0257827 | A1* | 8/2020 | Kounavis | H04L 9/0637 |
| 2020/0302068 | A1* | 9/2020 | Savry | G06F 21/602 |
| 2020/0371945 | A1* | 11/2020 | Peles | G06F 12/0875 |
| 2021/0200862 | A1* | 7/2021 | Lotspeich | G06F 21/54 |
| 2021/0218547 | A1* | 7/2021 | Weiler | H04L 9/0618 |
| 2021/0303304 | A1* | 9/2021 | Shanbhoque | G06F 9/30116 |

* cited by examiner

*Primary Examiner* — Joseph P Hirl
*Assistant Examiner* — Stephen T Gundry
(74) *Attorney, Agent, or Firm* — Æon Law; Adam L. K. Philipp; David V. H. Cohen

(57) ABSTRACT

Improved systems and methods of providing computer security and countering attacks on computing systems by protecting control data such as a return address from being disclosed or modified. A stack canary is enhanced with randomization to prevent brute-force attacks and information leakage, providing a more effective sentinel to detect attempts to overwrite a return address on the stack. A shadow stack is enhanced with concealment of the return address from the stack, encoding of the return address in memory, and replacement of the real return address with a substitute value to detect attempted manipulation of the return address on the call stack and prevent it from succeeding. By enhancing randomization of the stack canary and using a shadow stack to encode and conceal the return address, the disclosed technology enhances security of a computing system against stack smashing, ROP attacks, and JIT-ROP attacks.

29 Claims, 13 Drawing Sheets

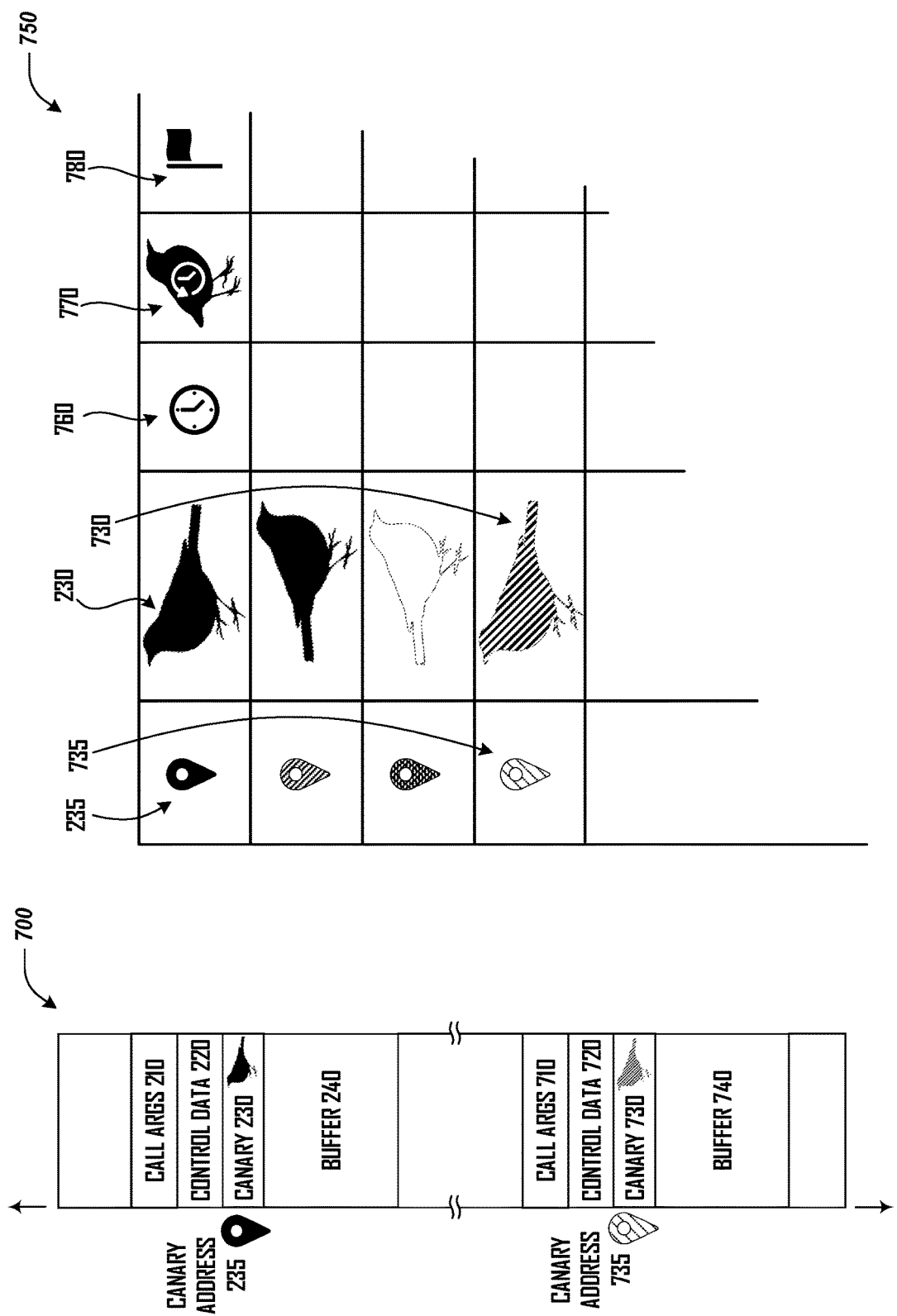

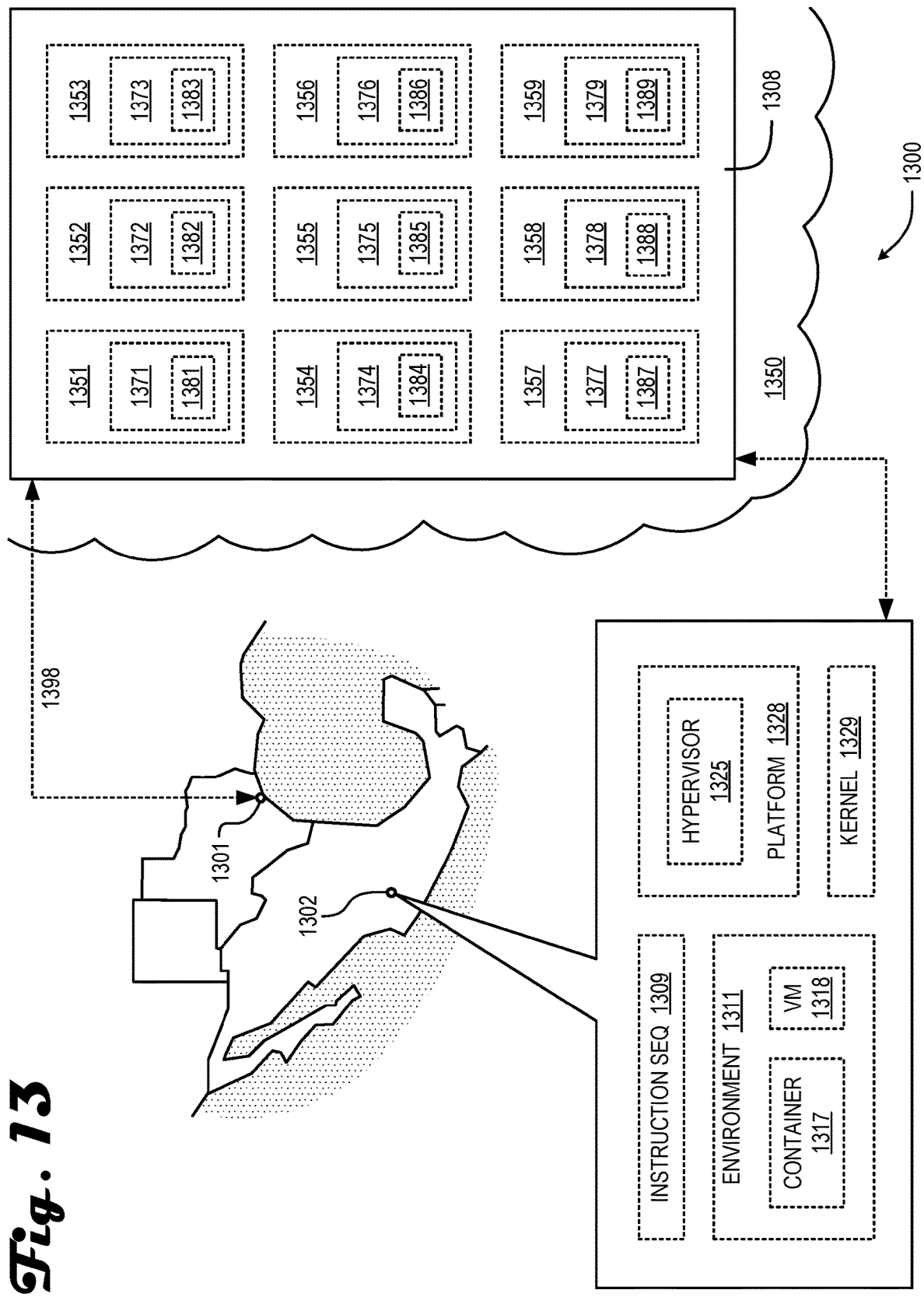

RANDOMIZED CANARY AND SHADOW STACK FOR JIT-ROP DEFENSE

RELATED APPLICATIONS

The entire contents of all priority documents referenced in the Application Data Sheet filed herewith are incorporated by reference herein, in their entireties, for all purposes.

FIELD

This disclosure is directed to improved apparatuses, methods, and systems of computer security and countering attacks on computing systems.

BACKGROUND

A well-known attack on computing systems is a "stack smashing" buffer overrun attack. An attacker writes a payload of malicious code into a vulnerable buffer on the call stack. The attacker writes beyond the bounds of the buffer to carefully overwrite a return address, replacing it with the address of the attacker's payload.

To defend against this attack vector, modern operating systems mark the memory containing the call stack as non-executable (executable space protection) and may require any executable code to be digitally authenticated (code signing). Thus, when the attacker writes payload code onto the stack, even if the attacker changes a return address to point to that code, the operating system will not run it.

Return-oriented programming (ROP) is a computer security exploit technique that enables an attacker to bypass those security defenses. An ROP attack starts in a similar way, by gaining control of the call stack and modifying program control data such as a return address. But instead of writing a payload of their own, the attacker identifies machine instruction sequences of authorized code already present in executable memory ("gadgets"). A gadget is a code snippet typically ending in a return instruction. By writing a series of return addresses to the stack, the attacker can chain together a series of gadgets. Gadgets may be devised from a program or a code library that has a known memory location, so the attacker can easily reference it. Using gadgets, an attacker can perform arbitrary operations despite defenses that thwart basic stack smashing attacks.

To defend against ROP attacks, operating systems attempt to randomize memory addresses (e.g., address space layout randomization, ASLR) to make gadgets more difficult for an attacker to find and use. However, attackers have devised memory disclosure attacks to locate gadgets in memory and circumvent address randomization. Just-in-time ROP attacks (JIT-ROP attacks) dynamically search for suitable gadgets in executable code pages, even if they have been randomized. This allows a JIT-ROP attacker to locate ROP gadgets and use them to piece together an attack payload.

BRIEF DESCRIPTION OF THE DRAWINGS

FIG. 7A illustrates an example computing system call stack including multiple stack canaries in accordance with an embodiment.

FIG. 7B illustrates an example data structure storing call stack addresses of multiple stack canaries in accordance with an embodiment.

FIG. 13 schematically depicts aspects of a system implementing one or more binary scrambling technologies in which one or more security enhancements may be implemented on one or both sides of an international border.

DETAILED DESCRIPTION

Figure 1:
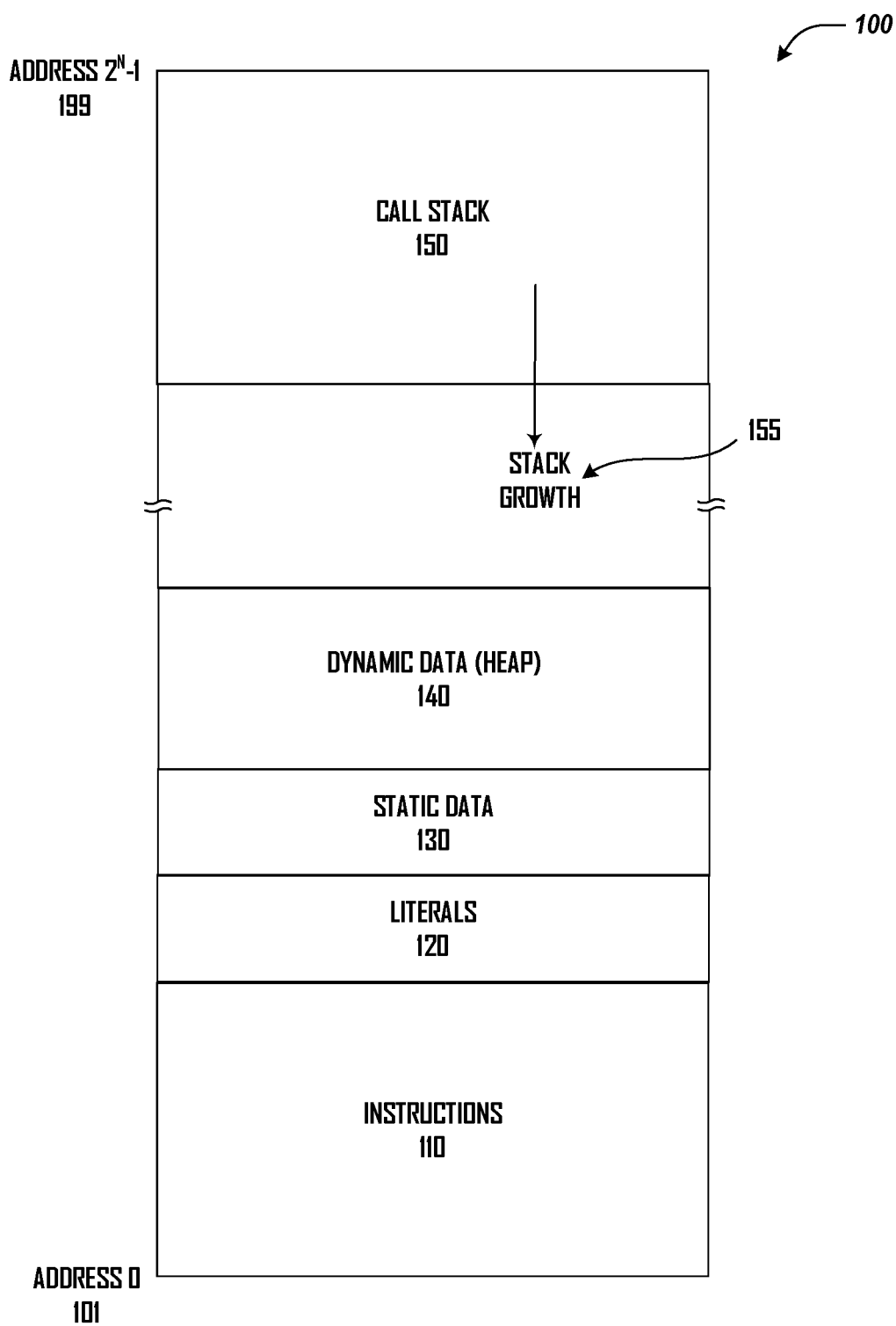
FIG. 1 is a schematic diagram illustrating data structures of an example computing system memory in which disclosed technologies may be incorporated.

This application discloses improved systems and methods of providing computer security and countering attacks on computing systems by protecting control data such as a return address from being disclosed or modified. The disclosed technology includes techniques for detecting attempts to overwrite a return address on a call stack, and preventing any overwrite of a return address on the call stack from succeeding. By enhancing randomization of a stack canary and using a shadow stack to encode and conceal a return address, the disclosed technology enhances security of a computing system against stack smashing, ROP attacks, and JIT-ROP attacks.

The disclosed technology is two-pronged. First, a stack canary is enhanced with randomization to prevent brute-force attacks and information leakage, providing a more effective sentinel to detect attempts to overwrite a return address on the stack. Second, a shadow stack is enhanced with the ability to conceal the return address from the stack, encode the return address in memory, and replace the real return address with a substitute value to foil an attacker and detect manipulation of the control data. Implementations of the disclosed technology make the computing system safer against attacks on the call stack.

As used herein, terms like "safer," "protected," "defended," "enhanced security," etc. describe a computing system or software object that lacks an actual or apparent attack vector vulnerability of another object. For example, if the disclosed technology is implemented in a computing system so that an attack chain or exploit directed at a software object in the computing system is more likely to be effectively severed, the disclosed technology makes the computing system and software object safer than they would otherwise be.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications, and equivalents. In alternate embodiments, additional security measures, or combinations of security measures, may be added or combined without limiting the scope to the embodiments disclosed herein. The embodiments set forth below are primarily described in the context of a conventional personal computer memory. However, the embodiments described herein are illustrative examples and in no way limit the disclosed technology to any particular memory configuration, computing technology, application, or platform.

The phrases "in an embodiment," "in various embodiments," "in some embodiments," and the like are used repeatedly. Such phrases do not necessarily refer to the same embodiment. The terms "comprising," "having," and "including" are synonymous, unless the context dictates otherwise. As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The disclosed binary scrambling systems and methods can take a variety of forms. FIGS. 1 through 13 illustrate several different arrangements and implementations. The illustrated embodiments and environments are not an exhaustive list; in other embodiments, a randomized stack canary or a shadow stack system, for example, could be arranged differently to operate in different computing architectures. However, it is not necessary to exhaustively show such optional implementation details to describe illustrative embodiments.

FIGS. 1-4 Illustrate Computing System Call Stacks with Stack Canaries.

FIG. 1 is a schematic diagram 100 illustrating data structures of an example computing system memory in which disclosed technologies may be incorporated.

The memory includes addresses from a lowest address 101 (e.g., 0) to a highest address 199 (e.g., $2^N-1$). The example memory includes instructions 110, literals 120 (e.g., fixed constant values for various data types such as integers or strings), static data 130 (e.g., global variables that persist for the life of a program), dynamic data 140 (e.g., a heap where memory may be allocated for objects, and released, in a mostly arbitrary order), and a call stack 150 (e.g., where memory may be temporarily used for functions, and released, in a specific order).

In the call stack 150, an operating system or memory management system generally allocates and releases memory by pushing known amounts of information onto a top of the stack, and then retrieving and releasing that information by popping the same amounts of information off the top of the stack in the reverse order (first-in, last-out). The top of a stack is not necessarily at a higher address in memory. For example, in the illustrated embodiment, the call stack 150 grows in a direction downward through the memory toward the lowest address 101 as shown by the indicated stack growth 155.

In various embodiments, the disclosed technology may be incorporated in a call stack that varies from the example call stack 150. For example, a call stack may grow in a different direction, be allocated in a different portion of memory, be shifted around in memory, be split, be duplicated, or be differently managed than the example call stack 150. Different instruction set architectures (ISAs) may provide different operations for tracking and manipulating data on the call stack 150. The call stack 150 may be known by different terms, e.g., "execution stack," "control stack," "program stack," or just "the stack." In various computing architectures, the call stack 150 may contain additional and/or different types of data, arranged differently, and organized into stack frames in a different manner. The examples provided in the present disclosure are intended to enable a person having ordinary skill in the art to apply the disclosed technology to various systems and situations in which a call stack is implemented. Those having ordinary skill in the art will also recognize the disclosed embodiments of applicant's technology are each merely an example and that variations thereof may be made without departing from the scope of the broader inventive concept set forth in the examples and claims below.

Figure 2:
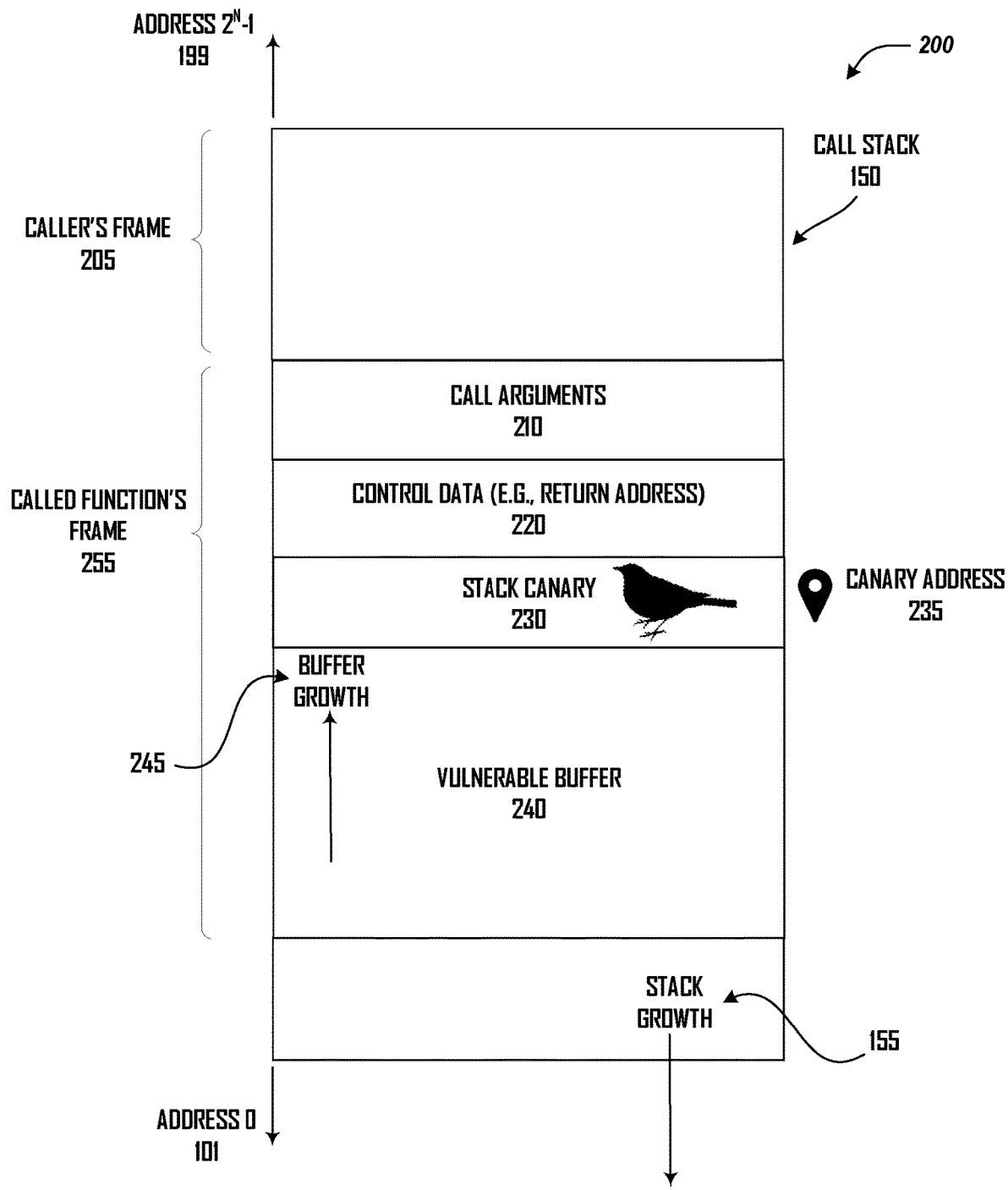
FIG. 2 is a schematic diagram illustrating an example computing system call stack including a stack canary.

FIG. 2 is a schematic diagram 200 illustrating an example computing system call stack 150 including a stack canary 230.

When a function is called, a computing system (such as the computer system 1101 described below with reference to FIG. 11) automatically stores information associated with the function call by pushing it onto the call stack 150. In the illustrated example, the call stack 150 includes a caller's frame 205, and prior to the caller making a function call, the caller's frame 205 was at the top of the call stack 150. Upon calling a called function, the called function's frame 255 is pushed onto the top of the call stack 150. The top of the example call stack 150 is at the bottom of the diagram, reflecting that the stack growth 155 of the call stack 150 is downward toward the lowest address 101 in this case.

Some of the information pushed onto the call stack 150 as part of the called function's frame 255 includes call arguments 210 (e.g., parameters passed to the called function) and a buffer 240 (e.g., a space designated to contain a local variable for use by the called function). The called function may use the information while the called function is running. The called function may also have access to information in the caller's frame 205. The called function may be able to write data to the stack, such as by assigning data to a variable that is on the call stack 150. In this example, data written into the buffer 240 is added from lower to higher addresses in the direction of buffer growth 245. In various computing systems, the direction of buffer growth 245 could be the same or the opposite of the direction of stack growth 155.

The computing system may reference information on the call stack 150 based on, for example, its position relative to a stack pointer identifying an address at the top of the call stack 150, or relative to a frame pointer to a data structure on or within the call stack 150 such as the caller's frame 205 or the called function's frame 255.

The called function's frame 255 also includes control data 220. The computing system uses control data 220 to manage program flow and/or the state of the call stack 150 itself. For example, the control data 220 generally includes a return address (e.g., the location of a next program instruction of the caller function) to which the operation of the current program should return when the called function is done. The control data 220 may also, or instead, include information about the caller's frame pointer or other information for maintaining operation of the running program.

Also included in the called function's frame 255 on the call stack 150 is a stack canary 230. A stack canary is a value placed onto the stack at a canary address 235, interposed between a buffer (such as the vulnerable buffer 240) and the control data 220. The stack canary would be, e.g., a 32-bit number for a computing system with 32-bit-addressed memory and a 64-bit number for a computing system with 64-bit-addressed memory. The stack canary is intended to be a secret value managed by the computing system, not associated with the functions of the running program and unknown to an attacker. Its purpose is, like the proverbial canary in a coal mine, to alert the computing system to potential danger by acting as a sentinel that the system can check on.

When the called function ends, the computing system releases the information that was being used by the called function and stored on the call stack 150 in the called function's frame 255, such as by changing the stack and/or frame pointers. The system also pops data off the call stack 150, including the stack canary 230. The system checks the stack canary 230 value to verify that it matches a known value. If the stack canary matches the known value, then the computing system proceeds to use the control data 220 to continue program operation.

Figure 3:
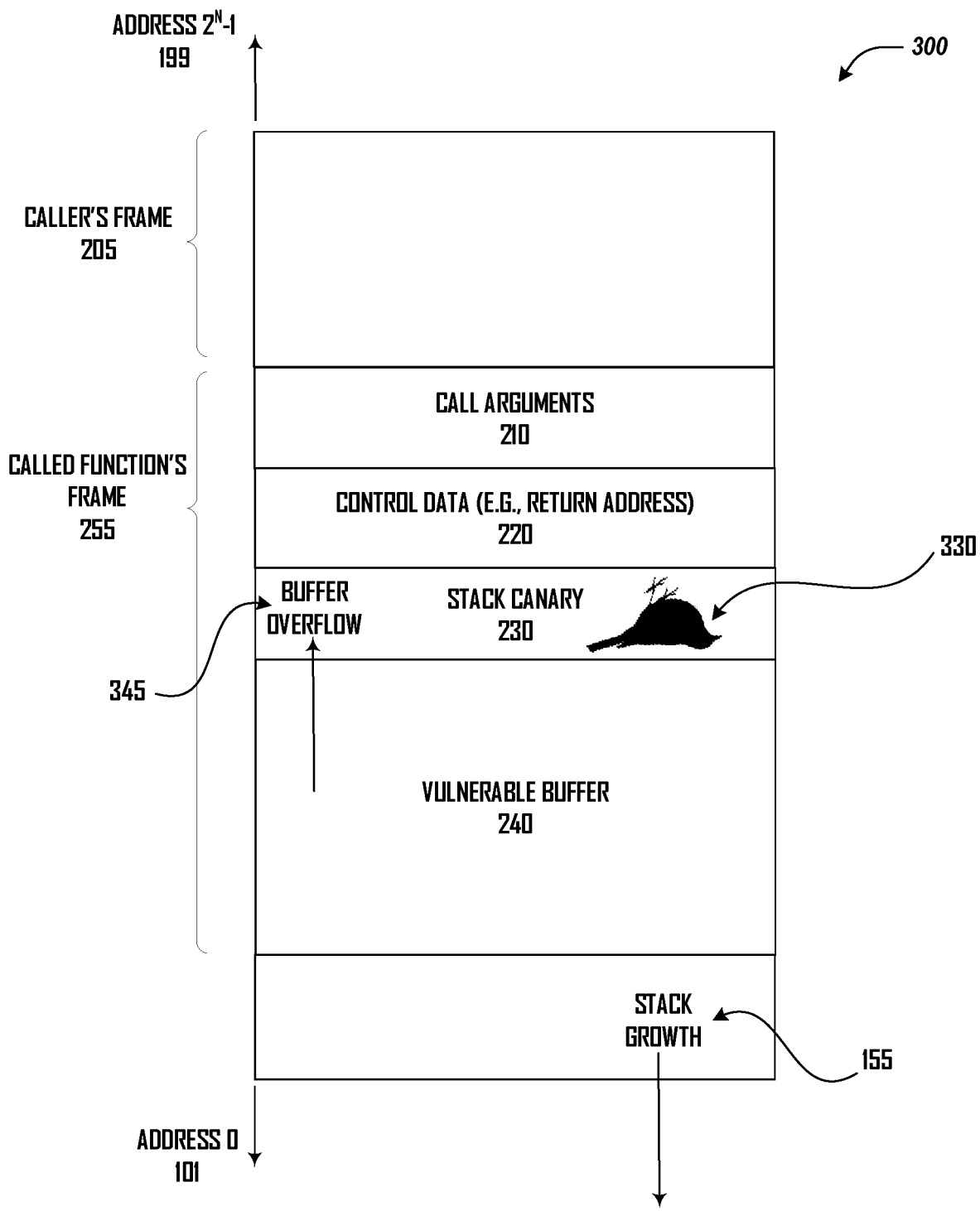
FIG. 3 is a schematic diagram illustrating an example computing system call stack in which a buffer overflow overwrites a stack canary.

FIG. 3 is a schematic diagram 300 illustrating an example computing system call stack in which a buffer overflow 345 overwrites a stack canary 330.

A vulnerability leaves the buffer 240 vulnerable to undesired manipulation or exploit. A classic example of such a vulnerability is a function (e.g., the C function strcpy) that allows data to be written or copied into the buffer 240 without checking whether the amount of data to be written exceeds the bounds of the buffer 240. Whether through efforts of a malicious actor or the result of an accidental programming error, the vulnerable buffer 240 can be used to read or write memory on the call stack 150 outside the buffer 240. For example, a buffer overflow 345 can result from more information being written into the vulnerable buffer 240 than fits in the allocated space on the call stack 150. If the control data 220 is overrun and corrupted, control flow will be misdirected when the function ends and the program attempts to return to the wrong address. ROP and JIT-ROP attacks use corruption of the control data 220 to point to attacker-desired code and compromise the computing system.

In this example, data written into the buffer 240 is added in the direction of buffer growth 245 until it writes past the bounds of the vulnerable buffer 240 and into the stack canary 230 in a buffer overflow 345. The direction of buffer growth 245 and thus buffer overflow 345 could be the same or the opposite of the direction of stack growth 155. If the direction of buffer growth 245 were different, the same buffer overflow 345 would threaten different data on the call stack 150, so the stack canary 230 could accordingly be differently positioned. Those of ordinary skill in the art understand that the technology disclosed herein for countering vulnerabilities can be configured to protect various computing system architectures, and that the examples depicted in the Figures do not limit the disclosed technology to the illustrated embodiments.

In this case, when the called function ends, the computing system checks the stack canary 230 value as before to verify that it matches the known value. However, the buffer overflow 345 has overwritten the original stack canary 230, leaving an overwritten value 330. As a result, the overwritten stack canary 330 no longer matches the known value, and fails the verification. Therefore, the computing system knows that the canary value 230 has been corrupted, so the integrity of the control data 220 is suspect. In response, the computing system may halt operation of the program. The computing system may also, or instead, take action to track or otherwise counter a detected malicious actor, e.g., by logging the possibly modified control data.

Figure 4:
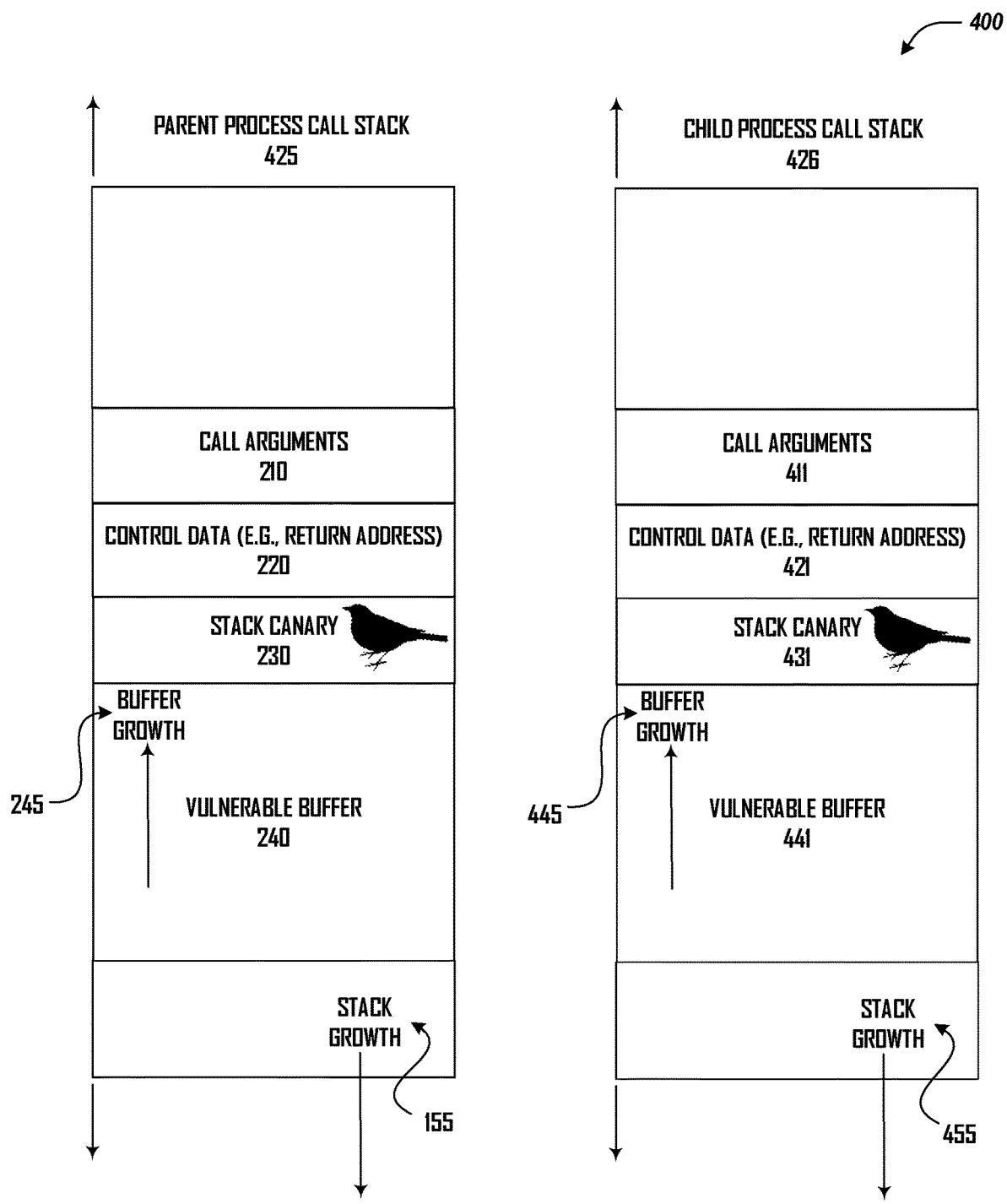
FIG. 4 is a schematic diagram illustrating example computing system call stacks of a parent process and a child process.

FIG. 4 is a schematic diagram 400 illustrating example computing system call stacks of a parent process 425 and a child process 426.

There is a computational cost to implement stack canaries. Each time a function returns, before the control data is used, the computing system must retrieve a known value and check the current stack canary 230 value against that known value. To minimize the computational cost, computing system engineers conventionally set a global variable containing the known value for a given program at run-time. To ensure entropy, a new global value is assigned (so that the stack canary 230 is generally different) each time the program is run.

Within a running program, conventional computing systems use a single stack canary 230 value. An attacker could attempt to obtain the stack canary 230 value by brute force, such as by trying to overwrite one byte at a time and see whether the program crashes. Such an attack, however, would be hampered by the fact that each time the program crashes and is run anew, a new stack canary 230 value would be assigned.

Many computing systems provide a run-time fork( ) or clone( ) system call to create a child process from a parent process. The parent process has an address space and a next program instruction; the fork( ) or clone( ) system call generates a child process that has a copy of the parent's address space and that is configured to execute a copy of the next program instruction. The cloned address space includes a child process call stack 426 that is a copy of the parent process call stack 425.

In the illustrated example, the parent process call stack 425 and the child process call stack 426 are clones. For example, the parent process function call arguments 210 are mirrored in the child process function call arguments 411; the parent process buffer 240 is exactly the same as the child process buffer 441; the parent process control data 220 is identical to the child process control data 421; and the parent process stack canary 230 value is the same as the child process 431 value.

Unfortunately, with the ability to clone a process including its stack canary 230 value, an attacker can potentially generate sufficient cloned or forked processes to brute-force the stack canary 230 value. The attacker can crash as many of those duplicate processes as needed to guess the stack canary 230 value (e.g., to work it out, one byte at a time). The attacker need not ever crash the parent process. If the attacker is able to determine the stack canary 230 value (whether by brute force, a side channel, or another vulnerability or exploit), the attacker can silently overwrite the stack canary 230 with the correct value (leaving it apparently untouched) and then proceed to alter the control data 220 and compromise the computing system.

The disclosed technology provides systems and methods that defeat such an attack and enhance computing system security against ROP attacks and JIT-ROP attacks as well. As discussed herein, configuration and operation of continuous binary scrambling systems and methods according to the present disclosure are unlike configuration and operation of conventional computing system call stack security, and enhance conventional computing system call stack security in a compatible and transparent manner.

FIGS. 5-7B and 10 Illustrate Randomized Stack Canary Systems and Methods.

Figure 5:
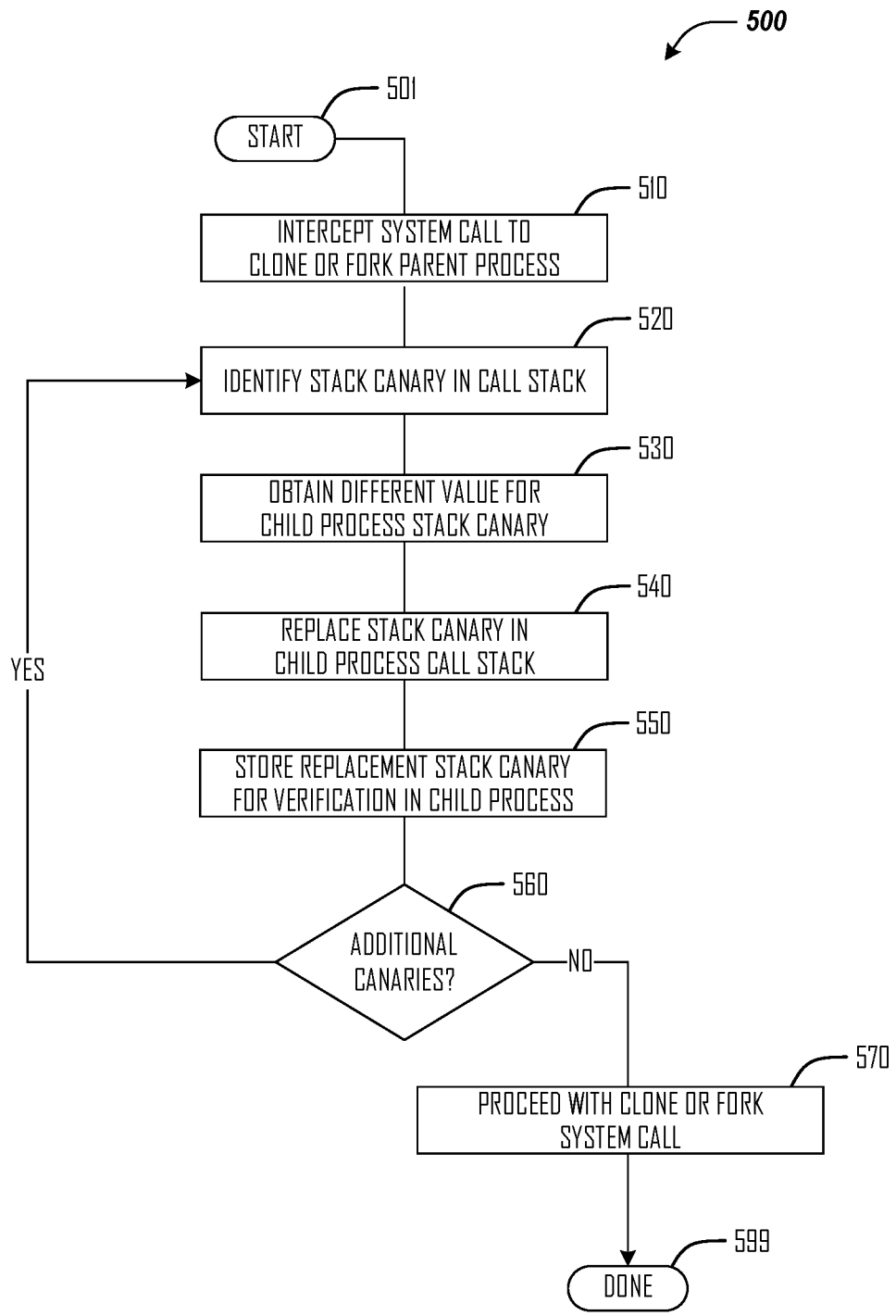
FIG. 5 illustrates an example operational routine of a randomized canary system in accordance with an embodiment.

FIG. 5 illustrates an example operational routine 500 of a randomized canary system in accordance with an embodiment.

The operational routines described herein, including operational routine 500, are performed by one or more computing systems, such as the computer system 1101 described below with reference to FIG. 11. They can be implemented in hardware, firmware, and/or software. As one example, the operational routine 500 (and each of the operational routines described herein) can be embodied in instructions executed by transistor-based circuitry running a computer operating system. The operational routine 500 begins in starting block 501.

In block 510, the operational routine 500 intercepts a system call to clone or fork a parent process. For example, in some embodiments, an operating system provides a fork( ) or clone( ) system call that the operational routine 500 can distinctly handle. In some cases, a fork( ) library function itself calls a clone( ) system call. In other systems, the mechanism to copy a parent process may be indirect or differently named.

Intercepting the system call can be accomplished in one or more ways, depending on the system. For example, in Linux systems, assigning a value to an LD_PRELOAD environment variable can cause a dynamic linker/loader to load a specified library of functions, and do so before loading any other library (including standard system libraries). The preloaded functions, if they have the same names as the standard system functions, can thus override or take precedence over those standard system functions. Other ways of intercepting a system call include compiling (or re-compiling) a program or function; linking (or re-linking) a program or function; or patching a compiled program or function binary.

In other embodiments, block 510 may modify a fork or clone system call (or a wrapper function) by altering, replacing, overriding, or adding prologue and/or epilogue code to the fork or clone system call.

In block 520, the operational routine 500 identifies a stack canary in the call stack, such as the stack canary 230 or 431 illustrated in FIG. 4. For example, in some implementations, the location of each stack canary in the call stack is determinable by reference to each of a series of frame pointers. If a single stack canary is used for a program, then each stack canary in the call stack may contain the same value.

In block 530, the operational routine 500 obtains a different value than the original stack canary 230 value for (or replacing) the child process stack canary 431 value. For example, this may include generating a pseudo-random number for the child process stack canary value. In some embodiments, the operational routine 500 may check the old and new values to ensure that they are different.

In block 540, the operational routine 500 replaces the child process stack canary 431 value with the different value, ensuring that the stack canary 431 in the child process does not match the stack canary 230 in the parent process.

In block 550, the operational routine 500 stores the replacement, different stack canary value for verification in the child process. In various embodiments, the operational routine 500 maintains the instantiation of the child process stack canary 431 value for verification in memory at a location outside the child process call stack 426.

In decision or loop block 560, the operational routine 500 determines whether additional stack canary values require changing. If so, the operational routine 500 iterates back to block 520 above to process the next stack canary, if any. If not, the operational routine 500 proceeds to block 570.

In block 570, the operational routine 500, having changed the stack canary values in the child process call stack 426, continues with the clone or fork operation.

The operational routine 500 ends in ending block 599.

Figure 6:
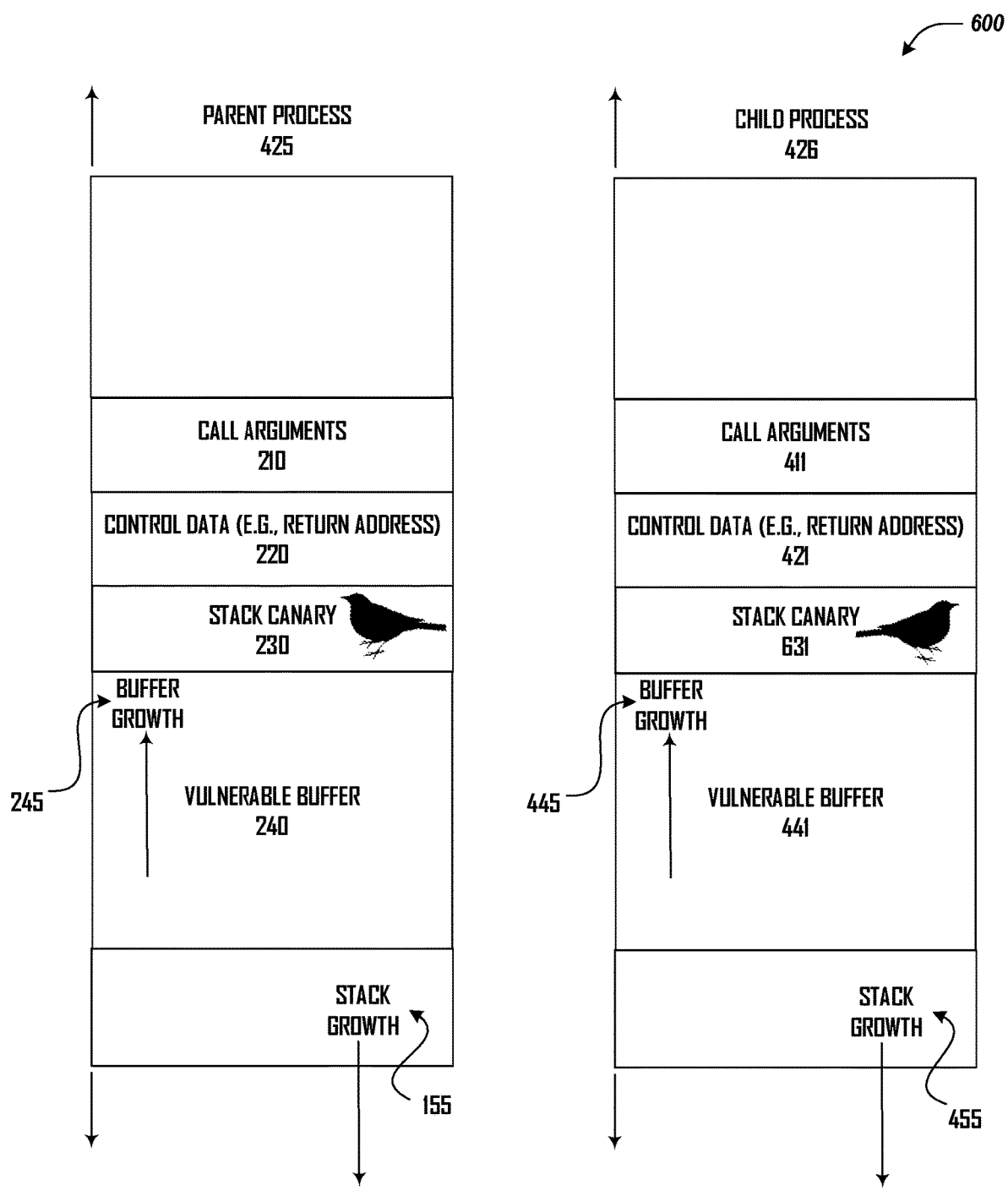
FIG. 6 is a schematic diagram illustrating example computing system call stacks of a parent process and a child process with a randomized stack canary in accordance with an embodiment.

FIG. 6 is a schematic diagram 600 illustrating example computing system call stacks of a parent process 425 and a child process 426 with a randomized stack canary 631 in accordance with an embodiment.

After the operational routine 500 of FIG. 5 has acted on the child process call stack 426 of FIG. 4, the child process stack canary 431 of FIG. 4 is replaced with the reinstantiated stack canary 631 of FIG. 6. The reinstantiated stack canary 631 does not match the parent process stack canary 230.

Because the reinstantiated stack canary 631 is a distinct value for each cloned or forked child process 426, an attacker who attempts to use brute force to discern the original parent process 425 stack canary 230 will fail. Not only does the reinstantiated stack canary 631 not match the parent process stack canary 230, but the reinstantiated stack canary 631 in each child process stack 426 will be different, meaning that the attacker will essentially be attempting to glean information from random data. As a result, the disclosed technology more effectively prevents the stack canaries 230 and 631 from being discovered, and thus more effectively protects the control data 220 and 421 from being overwritten. This enhances defense of the computing system against a JIT-ROP attacker, because if the attacker cannot as easily bypass the stack canary, the attacker cannot start the attack chain.

FIG. 7A illustrates an example computing system call stack 700 including multiple stack canaries 720, 730 in accordance with an embodiment.

The illustrated call stack 700 includes information from example call stack 150 as depicted in FIG. 2 above. The call stack 700 includes, for example, call arguments 210, control data 220, a first stack canary 230 located at a first canary address 235, and a (potentially vulnerable) buffer 240.

The call stack 700 also includes, at another memory location in the stack, information associated with another stack frame (i.e., associated with another call to a function). The latter information in the call stack 700 includes call arguments 710, control data 720, a second stack canary 730 located at a second canary address 735, and another buffer 740.

In the illustrated embodiment, the first stack canary 230 and the second stack canary 730 are part of the same program (and are thus in the same call stack 700) but have different values. Unlike conventional stack canary values that apply the same value to each stack canary in a running program, the disclosed technology allows a computing system to assign differing values to different stack canaries.

In some implementations, the system changes an originally provided program-wide stack canary value to multiple distinct reinstantiations. In others, the system is configured to obtain (e.g., generate or look up), assign, and store (for later verification) a distinct stack canary value for each function call that requires control data to be protected on the call stack. The system can use a pool of preset or randomly generated values for stack canaries, or provide each stack canary with a uniquely generated value. This additional dimension of randomness allows the disclosed technology to more comprehensively guard control data within a running program. This run-time defense provides additional protection against a JIT-ROP attacker, who cannot use one stack canary value to bypass multiple stack canaries.

FIG. 7B illustrates an example data structure 750 storing call stack addresses 235, 735 of multiple stack canaries 720, 730 in accordance with an embodiment.

In some embodiments, e.g., if multiple different stack canary values are maintained in the call stack, the system maintains a collection of instantiated (and/or reinstantiated) stack canary values and associated addresses. For example, the illustrated data structure 750 includes a collection of multiple different stack canaries for the program whose call stack 700 is depicted and described above with reference to FIG. 7A.

This example data structure stores data about a stack canary including a stack canary address 235 and a stack canary 230 value for a first stack canary. It also stores corresponding data about other stack canaries, including a second stack canary address 735 of a second stack canary 730.

In some embodiments, such a data structure may include additional information such as a time stamp 760. The time stamp 760 may be used in a system configured to re-randomize stack canary values at some interval. Any temporal interval is contemplated, from fractions of a second to minutes to hours to days and longer periods; system designers and administrators can choose an appropriate tradeoff between performance and security for a given application of the disclosed technology including any threat profile.

The data structure 750 may also include a stack canary history 770, such as a record of past values of an associated stack canary 230. For example, the system may maintain a record of recent stack canary 230 values (e.g., an original stack canary 230 value) for purposes of detecting whether an overwrite or other corruption of the stack canary 230 appears to be an attack. A flag 780 can indicate, for example, a stack canary that has been corrupted or that is due to be replaced in the data structure 750 and on the call stack 700.

The data structure 750 may comprise, for example, an array, a set, a list, a hash table, or another form of data storage suitable for maintaining a collection of stack canary locations and/or values. In some embodiments, the data structure 750 is maintained at a location in the memory outside the call stack. Because of the sensitive nature of its contents, the data structure 750 can be placed in a region of memory that is comparatively inaccessible to an attacker, can be encrypted and/or obfuscated, can be split and/or moved around in memory, and/or can be interspersed with dummy and/or trap or poison values, for example.

Stack canaries, especially when enhanced as disclosed herein, can provide an indicator of potential compromise and a bulwark against attackers using ROP or JIT-ROP exploits to take control of a computing system. However, a determined attacker may still be able to bypass stack canary protection, e.g., by obtaining a stack canary value from a side channel, by tricking the system into reading data including the stack canary value off the stack, or by writing to a well-chosen address on the stack (or e.g., writing non-contiguous data that skips over the stack canary) to alter control data without touching the stack canary. The disclosed technology includes additional protection for control data to prevent such ROP and JIT-ROP attacks from succeeding, thus improving computing system security.

FIGS. 8A-9 and 10 Illustrate Shadow Stack Systems and Methods.

Figures 8A, 8B:
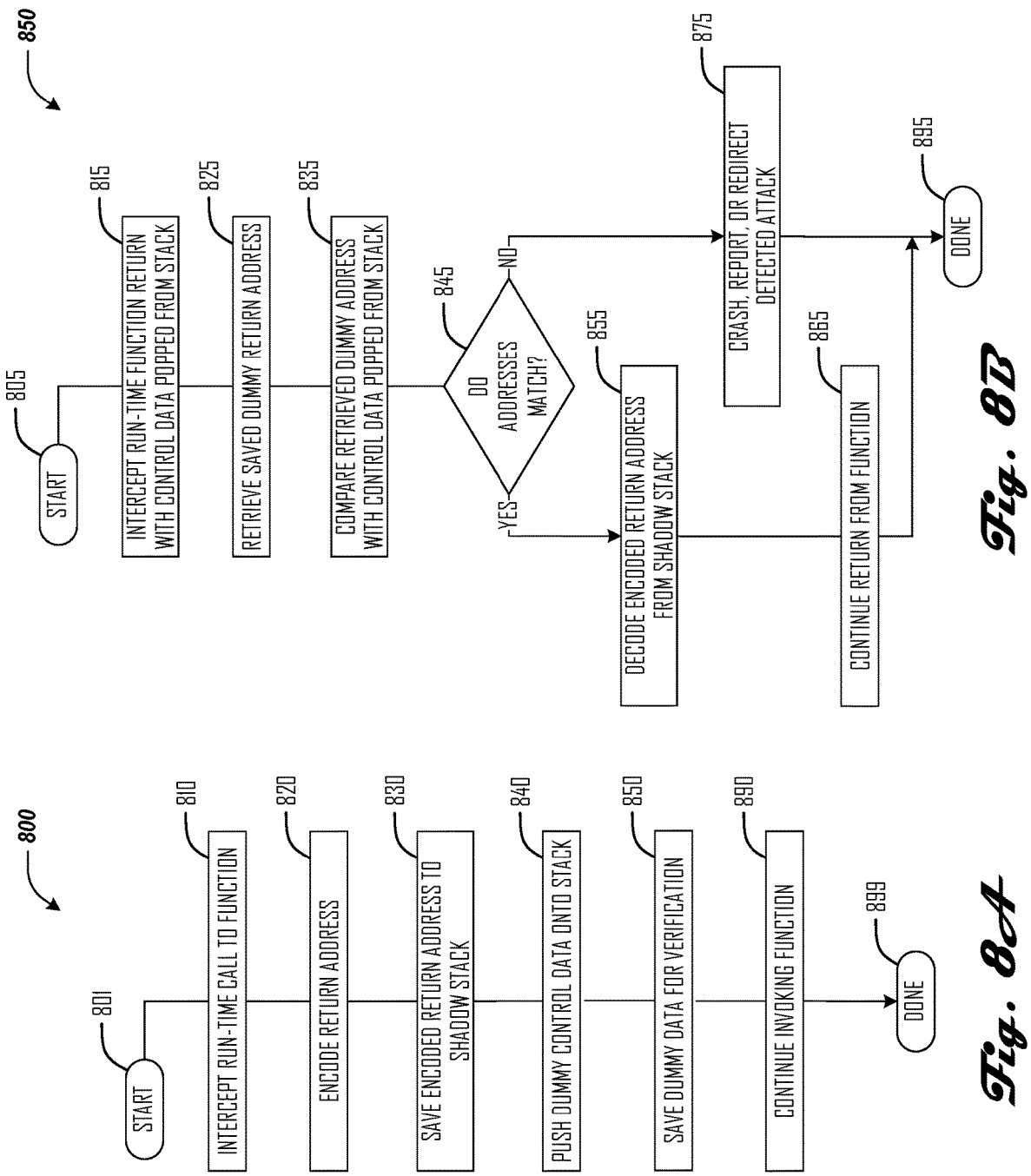
FIG. 8A illustrates an example operational routine of a shadow stack system handling a function call in accordance with an embodiment.
FIG. 8B illustrates an example operational routine of a shadow stack system handling a return from a function call in accordance with an embodiment.

FIG. 8A illustrates an example operational routine 800 of a shadow stack system handling a function call in accordance with an embodiment.

As mentioned above with reference to FIG. 5, the operational routine 800 is performed by a computing system, such as the computer system 1101 described below with reference to FIG. 11. The operational routine 800 begins in starting block 801.

In block 810, the operational routine 800 intercepts a run-time call to a function. As described above with reference to FIG. 2, when a function is called, a computing system automatically stores information associated with the function call by pushing it onto the call stack 150. Conventionally, the information placed on the stack includes control data such as a return address. ROP and JIT-ROP attacks leverage the presence of the return address on the stack to gain control of the computing system.

Intercepting the run-time call to a function can be accomplished in various ways, such as those described above with reference to FIG. 5. Thus, ways of intercepting a function invocation (e.g., a system call to direct program flow to the called function) include preloading an overriding system call to change how a function call is processed (e.g., altering, replacing, or adding prologue and/or epilogue code to the standard system call behavior, for all functions or for selected invocations); re-compiling a program or function (e.g., with a modified function prologue, and a correspondingly modified function epilogue); re-linking a program or function; or patching a compiled program or function binary.

In block 820, the operational routine 800 encodes the return address 220 that would conventionally be stored on the call stack 150. In some embodiments, the encoding is computationally fast, such as a bit shift or XOR operation, to minimize impact on computing system performance. In some embodiments, the operational routine 800 encrypts the return address 220, to maximize security of the return address 220. In some embodiments, the operational routine 800 adds time-based entropy to the encoding or encryption. Various implementations elect encoding operations that balance speed and security.

In block 830, the operational routine 800 saves the encoded return address from block 820 to a shadow stack data structure. The shadow stack is a data structure separate from the standard call stack 150 that is configured to store return addresses or other control data 220, and typically no other data. The shadow stack is preferably stored in a comparatively inaccessible location. For example, Intel® Control-flow Enforcement Technology (CET) instructions provide an implementation of a shadow stack that is hardware-based. A shadow stack in memory may be protected by other and/or additional measures such as guard pages (not unlike a stack canary for attempts to locate or access the shadow stack), shifting its location (and/or splitting it into multiple locations) in memory, rendering it as a sparse data structure, interspersing dummy and/or trap or poison values, and/or using obfuscation or other information hiding techniques, for example.

In block 840, the operational routine 800 pushes dummy control data onto the call stack 150. For a conventional shadow stack, when a function is called, the return address or other control data 220 is pushed onto the call stack 150 as normal, and a copy is pushed onto the shadow stack as well. Then, when the function ends, the system verifies that the return address on the call stack matches the copy of the return address retrieved from the shadow stack before proceeding. Any discrepancy indicates a potential attack that has been detected and can thus be stopped (e.g., by halting operation of the program). In the disclosed technology, by contrast, the call stack 150 does not contain the return address or other control data 220 at all. Instead, the call stack 150 holds dummy control data. In various embodiments, the operational routine 800 generates dummy control data such as null or zero bytes, pseudo-random data based on a source of entropy, or trap or poison data (e.g., a honeypot address) to foil an attacker.

In block 850, the operational routine 800 saves a copy of the dummy control data for later verification upon the attempted return of the called function. In some embodiments, the dummy control data is saved in the shadow stack, in conjunction with the encoded return address. In some embodiments, the dummy control data is saved in a separate data structure. Verification is described below with reference to FIG. 8B.

In block 890, the operational routine 800 continues invoking the called function normally. The operational routine 800 ends in ending block 899.

The disclosed technology separates the verification function performed by the dummy control data from the program control function performed by the contents of the return address. It also prevents an attacker from reading the return address from the call stack, protecting address space layout randomization (ASLR) and thus complicating an ROP attacker's task of assembling gadgets. The disclosed technology thus provides enhanced security for a computing system call stack.

FIG. 8B illustrates an example operational routine 850 of a shadow stack system handling a return from a function call in accordance with an embodiment.

As mentioned above with reference to FIG. 5, the operational routine 850 is performed by a computing system, such as the computer system 1101 described below with reference to FIG. 11. The operational routine 850 begins in starting block 805.

In block 815, the operational routine 850 intercepts a run-time return from a function. When a function ends, the computing system automatically pops the return address of the control data 220 off the call stack 150. In this case, however, with use of the disclosed technology, the data popped off the call stack 150 is dummy control data, as described above with reference to block 840 of FIG. 8A.

In block 825, the operational routine 850 retrieves (e.g., from the shadow stack) the dummy return address that the operational routine 800 saved for verification. In block 835, the operational routine 850 compares the retrieved dummy return address of block 825 against the dummy control data popped off the stack with the function return of block 815. In block 845, the operational routine 850 conditionally branches based on the result of the comparison.

In block 855, if the dummy return addresses match, then the verification succeeds and the operational routine 850 proceeds to retrieve and decode the encoded return address from the shadow stack. Then in block 865, the operational routine 850 continues the return from the called function as normal, sending control flow to the decoded return address.

In block 875, if the dummy return addresses do not match, then the verification fails. This indicates that an attacker or error overwrote one of the dummy return addresses, so the data present on the call stack 150 cannot be trusted. The operational routine 850 does not decode the encoded return address, so it remains hidden from an attacker. Instead, the operational routine 850 responds to the detected attack by crashing the program, reporting the detected attack, and/or redirecting the control flow to an attack detection and/or response system.

The operational routine 850 ends in ending block 895.

Figure 9:
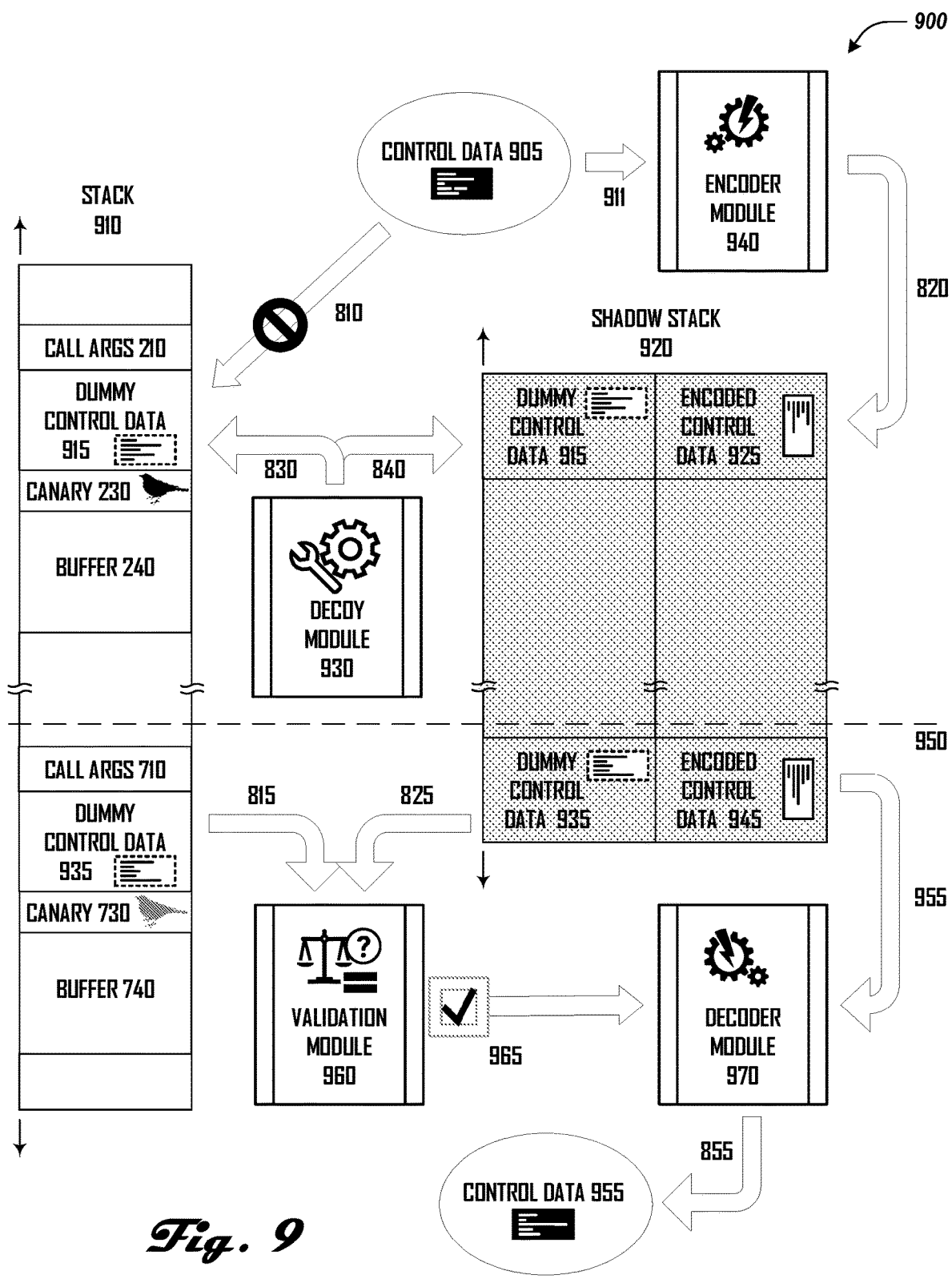
FIG. 9 is a schematic and data flow diagram illustrating example components of a shadow stack system in accordance with an embodiment.

FIG. 9 is a schematic and data flow diagram 900 illustrating example components of a shadow stack system in accordance with an embodiment.

A call stack 910 stores data in connection with a call to a function according to the disclosed technology. As described above with reference to block 810 of FIG. 8A, the system intercepts a run-time call to a function and, unlike conventional systems, does not place the control data 905 onto the call stack 910. Instead, the control data 905 is passed 911 to an encoder module 940. The encoder module 940 encodes the control data 905, generating encoded control data 925. The system stores 820 the encoded control data 925 on a shadow stack 920.

Meanwhile, a decoy module 930 obtains or generates dummy control data 915. The decoy module 930 provides the dummy control data 915 to be pushed 830 onto the stack in place of the original control data 905 that is not pushed onto the stack 810. The decoy module 930 also provides the dummy control data 915 to be stored 840 for later verification. In the illustrated embodiment, the dummy control data 915 is stored 840 in the shadow stack 920. In other embodiments, dummy control data 915 is stored 840 in a separate data structure.

As a result of the disclosed data flows, the call stack 910 includes a double layer of protection: a stack canary 230 that guards dummy control data 915 from an attack such as an overflow of a buffer 240. For clarity, the schematic and data flow diagram 900 illustrates manipulation of the control data and dummy control data, rather than the stack canary 230; however, they work together to reinforce protection of the control data 905.

The schematic and data flow diagram 900 shows example data flows for ease of comprehension; however, one of ordinary skill in the art understands that data does not necessarily flow in the exact paths illustrated. For example, the dummy control data 915 may be placed into a register by the decoy module 930, and function prologue code may copy and/or move the contents of that register to one or more destinations. While such details and variations are more granular than the schematic and data flow diagram 900, they are contemplated by and are within the scope of the disclosed technology.

Below the dashed line 950, the schematic and data flow diagram 900 illustrates a return from a function according to the disclosed technology. The call stack 910 contains data from a function call such as call arguments 710 passed to the function on the stack 910; dummy control data 935 provided by a decoy module 930; a second stack canary 730 (which may have a different value than the first stack canary 230); and a buffer 740. The disclosed technology mitigates the potential vulnerability of the buffer 740.

As described above with reference to FIG. 8B, the system intercepts a run-time return from a function and retrieves or receives 815 the dummy control data 935 from the call stack 910. The system also obtains 825 the stored dummy control data 935 from the data structure in which it was saved for verification, such as the shadow stack 920.

A validation module 960 compares the version of the dummy control data 935 that was popped 815 from the call stack 910 against the version of the dummy control data 935 that was retrieved 825 from the shadow stack 920. If the validation or verification is successful 965, then the system passes 955 the encoded control data 945 to a decoder module 970 for decoding. After decoding the encoded control data 945, the decoder module 970 provides 855 the decoded control data 955 to the system for continued program operation.

Figure 10:
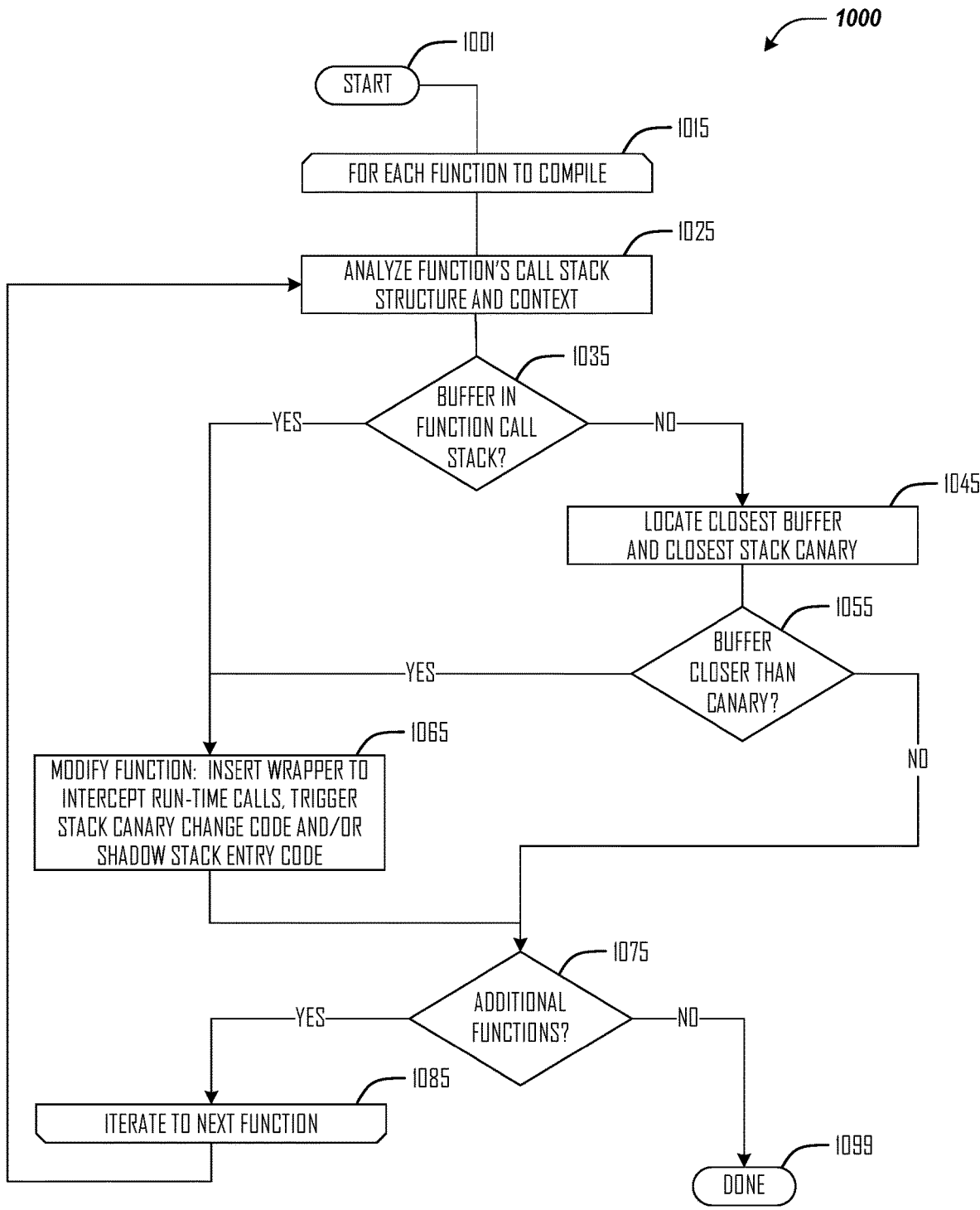
FIG. 10 illustrates an example operational routine of a compilation system to instrument a function with a randomized stack canary and/or shadow stack in accordance with an embodiment.

FIG. 10 illustrates an example operational routine 1000 of a compilation system to instrument a function with a randomized stack canary and/or shadow stack in accordance with an embodiment.

As mentioned above with reference to FIG. 5, the operational routine 1000 is performed by a computing system, such as the computer system 1101 described below with reference to FIG. 11. The operational routine 1000 begins in starting block 1001.

In opening loop block 1015, the operational routine 1000 begins iterating through a set of functions to compile, such as all of the functions associated with a program. The example operational routine 1000 begins with analysis of a first function. In some implementations, the operational routine 1000 analyzes multiple functions (e.g., the functions of a program) as a group or in whole.

In block 1025, the operational routine 1000 analyzes the call stack structure and context of the function being analyzed. For example, the compilation system determines the type and size of each parameter that will be passed to the function according to the function's prototype or declaration, and of each local variable that is declared within the function. In some implementations, the analysis may identify potential vulnerabilities such as a call to a function that does not protect against buffer overruns.

In decision block 1035, the operational routine 1000 determines whether a potentially vulnerable buffer 240 is present in the function call stack 150. In some implementations, the compilation system determines whether any buffer 240 of a certain type and/or size is present (e.g., a string or character buffer, an array, or a variable that is the target of an assignment). The compilation system can thus be configured to place a stack canary 230 on the call stack 150 selectively to minimize effects on performance.

In block 1045, if the result of decision block 1035 is that no buffer 240 (or no buffer 240 meeting the compiler's criteria) is present in the analyzed function, then in some embodiments the operational routine 1000 may determine a location of a closest buffer and a closest stack canary in potential program flow. Based on those determinations, in decision block 1055, the operational routine 1000 determines whether a potentially vulnerable buffer may be present on the stack and closer than a closest stack canary. In some implementations, the operational routine 1000 performs the analysis based on a probabilistic or worst-case series of function invocations.

In block 1065, if the analyzed function includes a potentially vulnerable buffer (i.e., if the answer from decision block 1035 is "yes"), or if a potentially vulnerable buffer may be present on the stack and closer than a closest stack canary (i.e., if the answer from decision block 1055 is "yes"), then the operational routine 1000 modifies the function to implement one or more of the disclosed technologies. For example, the compilation system may insert a wrapper around the function or modify a function prologue and epilogue to intercept or change the behavior of run-time calls to the function and returns from the function. This enables the compilation system to seamlessly, and with minimal overhead, trigger code that implements stack canary randomization and/or shadow stack return address concealment for protection of control data and defense against JIT-ROP attacks.

In decision block 1075, after the function has been modified according to block 1065, or if the analyzed function does not need modification because the answers from decision block 1035 and decision block 1055 are both "no", then the operational routine 1000 proceeds to determine whether there are any additional functions in the program to be analyzed. If so, then in block 1085, the operational routine 1000 iterates to the next function in the set and proceeds in block 1025.

When there are no more functions for the operational routine 1000 to analyze, the operational routine 1000 ends in ending block 1099.

Figure 11:
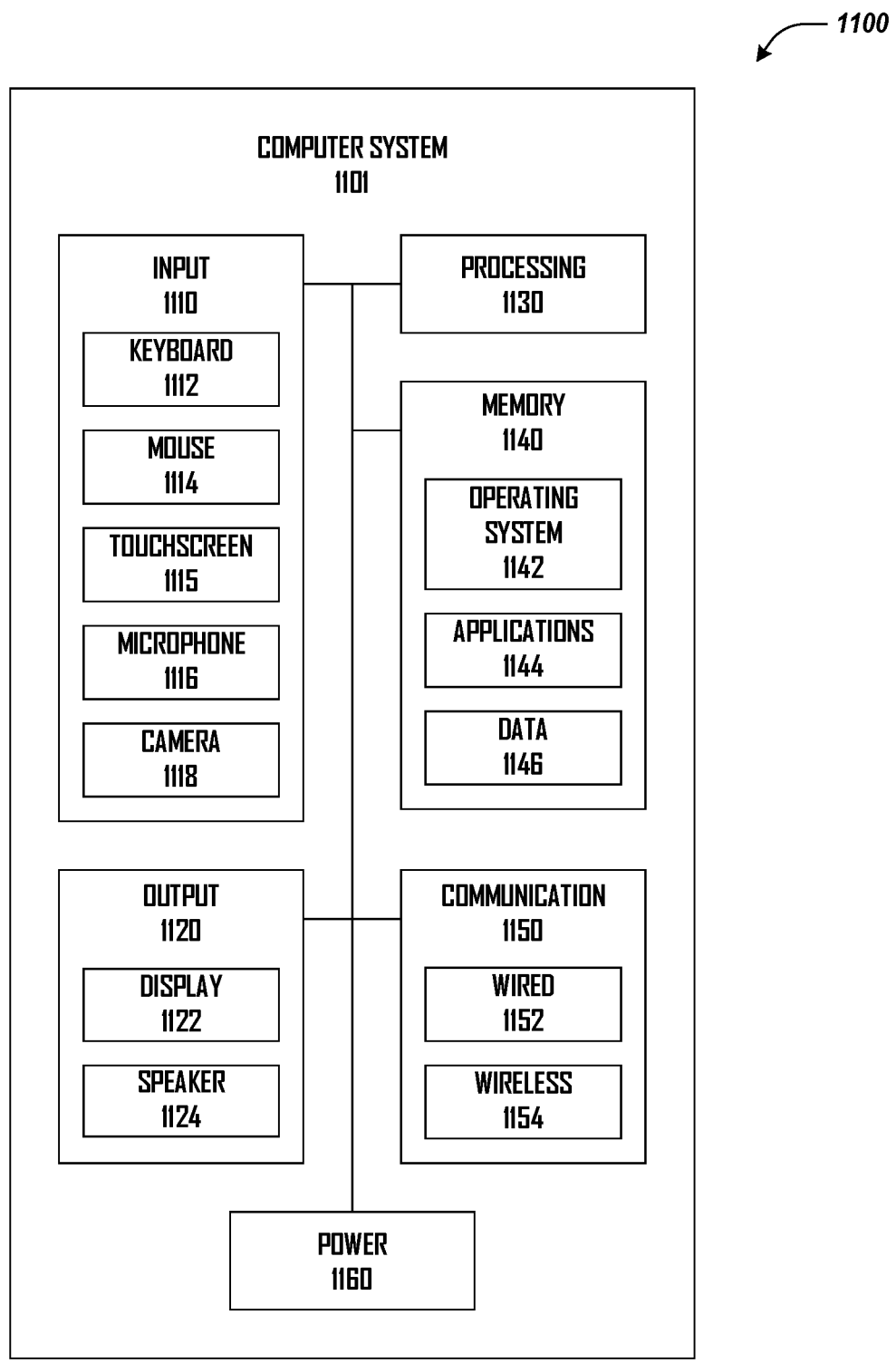
FIG. 11 is a block diagram illustrating operational components of an example computing system on which disclosed technologies can be implemented.
Figure 12:
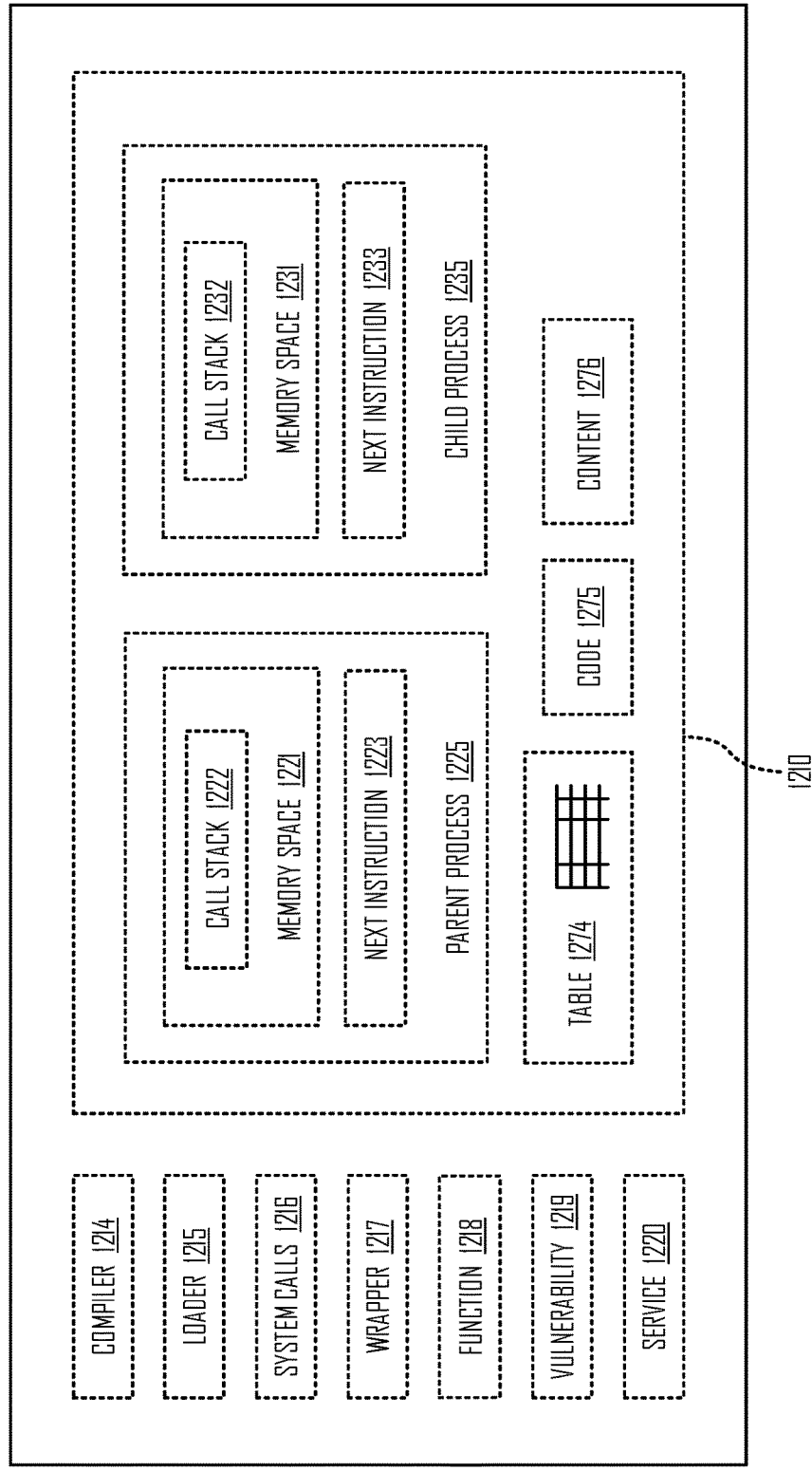
FIG. 12 is a block diagram illustrating data structures borne by computer-readable storage media in which disclosed technologies may be incorporated.

FIGS. 11 and 12 illustrate computing systems in which the disclosed technologies can be implemented.

FIG. 11 is a block diagram 1100 illustrating operational components of an example computing system 1101 on which disclosed technologies can be implemented.

In the illustrated embodiment, the computer system 1101 includes a processing component 1130 that controls operation of the computer system 1101 in accordance with computer-readable instructions stored in memory 1140. The processing component 1130 may be any logic processing unit, such as one or more central processing units (CPUs), graphics processing units (GPUs), digital signal processors (DSPs), field-programmable gate arrays (FPGAs), application-specific integrated circuits (ASICs), etc. The processing component 1130 may be a single processing unit or multiple processing units in an electronic device or distributed across multiple devices. Aspects of the present technology can be embodied in a special purpose computing device or data processor that is specifically programmed, configured, or constructed to perform one or more of the computer-executable instructions explained in detail herein.

Aspects of the present technology can also be practiced in distributed computing environments in which functions or modules are performed by remote processing devices that are linked through a communications network, such as a local area network (LAN), wide area network (WAN), or the Internet. In a distributed computing environment, modules can be located in both local and remote memory storage devices. In various embodiments, the computer system 1101 may comprise one or more physical and/or logical devices that collectively provide the functionalities described herein. In some embodiments, the computer system 1101 may comprise one or more replicated and/or distributed physical or logical devices. In some embodiments, the computer system 1101 may comprise one or more computing resources provisioned from a "cloud computing" provider, for example, Amazon® Elastic Compute Cloud ("Amazon EC2®"), Amazon Web Services® ("AWS®"), and/or Amazon Simple Storage Service™ ("Amazon S3™"), provided by Amazon.com, Inc. of Seattle, Wash.; Google Cloud Platform™ and/or Google Cloud Storage™, provided by Google Inc. of Mountain View, Calif.; Windows Azure®, provided by Microsoft Corporation of Redmond, Wash.; and the like.

The processing component 1130 is connected to memory 1140, which can include a combination of temporary and/or permanent storage, and both read-only memory (ROM) and writable memory (e.g., random access memory or RAM, CPU registers, and on-chip cache memories), writable non-volatile memory such as flash memory or other solid-state memory, hard drives, removable media, magnetically or optically readable discs and/or tapes, nanotechnology memory, synthetic biological memory, and so forth. A memory is not a propagating signal divorced from underlying hardware; thus, a memory and a computer-readable storage medium do not refer to a transitory propagating signal per se. The memory 1140 includes data storage that contains programs, software, and information, such as an operating system 1142, application programs 1144, and data 1146. Computer system 1101 operating systems 1142 can include, for example, Windows®, Linux®, Android™, iOS®, and/or an embedded real-time operating system. The application programs 1144 and data 1146 can include software and databases—including data structures, database records, other data tables, etc.—configured to control computer system 1101 components, process information (to, e.g., optimize program code data), communicate and exchange data and information with remote computers and other devices, etc. The memory 1140 includes the main memory 100 described above with reference to FIG. 1, and contains code for the operational routines and modules described herein, as well as the data structures described herein.

The computer system 1101 can include input components 1110 that receive input from user interactions and provide input to the processor 1130, typically mediated by a hardware controller that interprets the raw signals received from the input device and communicates the information to the processor 1130 using a known communication protocol. Examples of an input component 1110 include a keyboard 1112 (with physical or virtual keys), a pointing device (such as a mouse 1114, joystick, dial, or eye tracking device), a touchscreen 1115 that detects contact events when it is touched by a user, a microphone 1116 that receives audio input, and a camera 1118 for still photograph and/or video capture. The computer system 1101 can also include various other input components 1110 such as GPS or other location determination sensors, motion sensors, wearable input devices with accelerometers (e.g., wearable glove-type input devices), biometric sensors (e.g., a fingerprint sensor), light sensors (e.g., an infrared sensor), card readers (e.g., a magnetic stripe reader or a memory card reader), and so on.

The processor 1130 can also be connected to one or more various output components 1120, e.g., directly or via a hardware controller. The output devices can include a display 1122 on which text and graphics are displayed. The display 1122 can be, for example, an LCD, LED, or OLED display screen (such as a desktop computer screen, handheld device screen, or television screen), an e-ink display, a projected display (such as a heads-up display device), and/or a display integrated with a touchscreen 1115 that serves as an input device as well as an output device that provides graphical and textual visual feedback to the user. The output devices can also include a speaker 1124 for playing audio signals, haptic feedback devices for tactile output such as vibration, etc. In some implementations, the speaker 1124 and the microphone 1116 are implemented by a combined audio input-output device.

In the illustrated embodiment, the computer system 1101 further includes one or more communication components 1150. The communication components can include, for example, a wired network connection 1152 (e.g., one or more of an Ethernet port, cable modem, Thunderbolt cable, FireWire cable, Lightning connector, universal serial bus (USB) port, etc.) and/or a wireless transceiver 1154 (e.g., one or more of a Wi-Fi transceiver; Bluetooth transceiver; near-field communication (NFC) device; wireless modem or cellular radio utilizing GSM, CDMA, 3G, 4G, and/or 5G technologies; etc.). The communication components 1150 are suitable for communication between the computer system 1101 and other local and/or remote computing devices, directly via a wired or wireless peer-to-peer connection and/or indirectly via a communication link and networking hardware, such as switches, routers, repeaters, electrical cables and optical fibers, light emitters and receivers, radio transmitters and receivers, and the like (which can include the Internet, a public or private intranet, a local or extended Wi-Fi network, cell towers, the plain old telephone system (POTS), etc.). The computer system 1101 further includes power 1160, which can include battery power and/or facility power for operation of the various electrical components associated with the computer system 1101.

Examples of well-known computing systems, environments, and/or configurations that may be suitable for use with the technology include, but are not limited to, personal computers, server computers, handheld or laptop devices, mobile phones, wearable electronics, tablet devices, internet-of-things (IoT) devices, appliances, multiprocessor systems, microprocessor-based systems, set-top boxes, programmable consumer electronics, network PCs, minicomputers, mainframe computers, workstations, distributed computing environments that include any of the above systems or devices, or the like. While computer systems configured as described above are typically used to support the operation of the technology, one of ordinary skill in the art will appreciate that the technology may be implemented using devices of various types and configurations, and having various components. It is not necessary to show such infrastructure and implementation details to describe an illustrative embodiment.

FIG. 12 is a block diagram 1200 illustrating data structures borne by computer-readable storage media in which disclosed technologies may be incorporated.

The memory 1140 of FIG. 11 schematically may comprise one or more instances of a compiler 1214, a loader 1215, system calls 1216, a wrapper 1217, a function 1218, a vulnerability 1219, a service 1220, or of other such digital entities in which one or more technologies may be implemented to improve the safety of operation of the computer system 1101. In some contexts or instances 1210, for example, such items may include a parent process 1225 including a memory space 1221 containing a call stack 1222, and a next instruction 1223; and a child process 1235 including a memory space 1231 containing a call stack 1232, and a next instruction 1233. They may also include data structures such as a table 1274, code 1275, and content 1276.

FIG. 13 schematically depicts aspects of a system 1300 implementing one or more binary scrambling technologies in which one or more security enhancements may be implemented on one or both sides of an international border.

Cyberattacks come in many forms and in some contexts it is helpful to have a pervasive and agile defense. As depicted, a client device or other hardware-implemented interface 1302 in Mexico may interact with another hardware-implemented interface 1301 in Texas via one or more communication channels 1398 therebetween.

In the interest of conciseness and according to standard usage in information management technologies, the functional attributes of modules described herein are set forth in natural language expressions. It will be understood by those skilled in the art that such expressions (e.g., functions or acts) adequately describe structures identified herein so that no undue experimentation is required for their implementation.

For example, any session parameters or other informational data identified herein may easily be represented digitally as a voltage configuration on one or more electrical nodes (e.g., conductive pads of an integrated circuit) of an event-sequencing structure without any undue experimentation. Each electrical node is highly conductive, having a corresponding nominal voltage level that is spatially uniform generally throughout the node (e.g., within a device or local system as described herein) at relevant times (e.g., at clock transitions). Such nodes (e.g., lines on an integrated circuit or circuit board) may each comprise a forked or other signal path adjacent one or more transistors.

Moreover, many Boolean values (true-or-false, on-or-off, 1-or-0, yes-or-no decisions, etc.) may each be manifested as either a "low" or "high" voltage, for example, according to a complementary metal-oxide-semiconductor (CMOS), emitter-coupled logic (ECL), or other common semiconductor configuration protocol. In some contexts, for example, one skilled in the art will recognize an "electrical node set" as used herein in reference to one or more electrically conductive nodes upon which a voltage configuration (of one voltage at each node, for example, with each voltage characterized as either high or low) manifests a yes/no decision or other digital data.

Such circuitry 1308 may comprise one or more integrated circuits (ICs), for example, optionally mounted on one or more circuit boards. Whether implemented in a distributed cloud or within one or more interfaces 1301, 1302 or other devices described herein, transistor-based circuitry 1308 comprises an event-sequencing structure. Transistor-based circuitry 1308 may (optionally) include one or more instances of invocation modules 1351 configured to invoke one or more other modules 1352-1359 configured to perform a function, for example, each including an electrical node set 1371-1379 upon which informational data is represented digitally as a corresponding voltage configuration 1381-1389. (When a user or other signal originator "invokes" one or more modules 1352-1359 configured to perform a function, other circuitry along the signal path will also typically "invoke" circuitry downstream configured to perform that function, in a cascading fashion.) In various implementations, the modules 1351-1359 may include one or more instances of an encoder module, a decoder module, a decoy module, a randomization module, a validation module, a control module, a response module, etc.

A server or other interface 1301, 1302 in one country may manifest one or more instances of an instruction sequence 1309, of a virtualization or other computing environment 1311 (e.g., comprising one or more virtual containers 1317 or virtual machines 1318), or of a hypervisor 1325 or other components that support a platform 1328 or kernel 1329 (or both). Regardless of how such circuitry 1308 is installed or arranged, it may be reconfigured for performance or geography.

With respect to the numbered claims expressed below, those skilled in the art will appreciate that recited operations therein may generally be performed in any order. Also, although various operational flows are presented in sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other such transitive, relational, or other connections do not generally exclude such variants, unless context dictates otherwise.

Although specific embodiments have been illustrated and described herein, it will be appreciated by those of ordinary skill in the art that alternate and/or equivalent implementations may be substituted for the specific embodiments shown and described without departing from the scope of the present disclosure. For example, although various embodiments are described above in terms of a schematic memory layout including a downward-growing stack, in other embodiments the disclosed technology may be implemented in various other memory configurations and computing architectures. This application is intended to cover any adaptations or variations of the embodiments discussed herein.

What is claimed is:

1. A security-enhanced computing method configured to improve defense against a return-oriented-programming stack buffer overflow attack against a computing system having a memory containing a first call stack for a first process, the security-enhanced computing method comprising:

invoking transistor-based circuitry configured to, in the first process, upon a run-time call to a function:
obtain a control data bit sequence associated with a return from the call to the function;
obtain a substitute bit sequence different from the control data bit sequence;
cause the substitute bit sequence to be placed in the first call stack and cause the control data bit sequence not to be placed in the first call stack;
maintain an instantiation of the control data bit sequence in the memory at a location outside the first call stack;
obtain a first stack canary value;
cause the first stack canary value to be placed in the first call stack between a buffer and the substitute bit sequence such that a buffer overflow that overwrites the substitute bit sequence also overwrites the first stack canary value; and
maintain an instantiation of the first stack canary value for verification;

invoking transistor-based circuitry configured to, in the first process, upon a run-time return from the call to the function:
obtain a verification of whether the first stack canary value matches the maintained copy of the first stack canary value to ensure that an overflow of the buffer has not overwritten the first stack canary value and the substitute bit sequence;
obtain the instantiation of the control data bit sequence from the memory at the location outside the first call stack; and
continue operation of the computing system according to the control data bit sequence only if the verification is successful;

invoking transistor-based circuitry configured to, upon a run-time creation of a second process that is a cloned copy of the first process, including a second call stack for the second process that is created as a copy of the first call stack for the first process:
obtain a second stack canary value different from the first stack canary value;
replace, in the second call stack, the first stack canary value with the second stack canary value, such that the first stack canary value is not included in the second call stack;
maintain an instantiation of the second stack canary value for verification instead of a copy of the first stack canary value; and
maintain an instantiation of the control data bit sequence in the memory at a location outside the second call stack;

invoking transistor-based circuitry configured to, in the second process, upon a run-time return of the function:
obtain a verification that the second stack canary value matches the maintained copy of the second stack canary value to ensure that an overflow of the buffer has not overwritten the second stack canary value and the substitute bit sequence;
obtain the instantiation of the control data bit sequence from the memory at the location outside the second call stack; and
continue operation of the computing system according to the control data bit sequence only if the verification is successful.

2. The security-enhanced computing method of claim 1, wherein the instantiation of the control data bit sequence and the instantiation of the second stack canary value for verification are both maintained in the memory at a location outside the second call stack.

3. The security-enhanced computing method of claim 1, wherein the causing the substitute bit sequence to be placed in the first call stack and causing the control data bit sequence not to be placed in the first call stack protects the control data bit sequence against discovery or modification by an attacker.

4. The security-enhanced computing method of claim 1, wherein the control data bit sequence associated with a return from the call to the function comprises a return address.

5. The security-enhanced computing method of claim 1, further comprising if the verification is not successful, modify the operation of the computing system to crash the function or process, misdirect the attack, log a record of the attack, and/or track a source of the attack.

6. The security-enhanced computing method of claim 1, wherein the computing system comprises a fork( ) or clone( ) system call to create, from a parent process having an address space and a next program instruction, a child process that has a copy of the address space and that is configured to execute a copy of the next program instruction, such that the run-time creation of the second process that is a cloned copy of the first process is performed by the fork( ) or clone( ) system call.

7. The security-enhanced computing method of claim 6, further comprising modifying the fork( ) or clone( ) system call by altering, replacing, overriding, or adding prologue and/or epilogue code to the fork( ) or clone( ) system call.

8. The security-enhanced computing method of claim 6, further comprising intercepting the fork( ) or clone( ) system call by at least one of: assigning a value to an LD_PRELOAD environment variable; re-compiling a program or function; re-linking a program or function; or patching a compiled program or function binary.

9. The security-enhanced computing method of claim 1, wherein the replacing, in the second call stack, the first stack canary value with the second stack canary value, such that the first stack canary value is not included in the second call stack provides a defense against an attacker attempting to determine the first stack canary value.

10. The security-enhanced computing method of claim 1, wherein the obtaining a second stack canary value different from the first stack canary value comprises generating a pseudo-random number for the second stack canary value.

11. The security-enhanced computing method of claim 1, wherein the replacing, in the second call stack, the first stack canary value with the second stack canary value comprises changing multiple stack canary values in the second call stack.

12. The security-enhanced computing method of claim 1, further comprising changing each stack canary value in the second call stack.

13. A security-enhanced computing apparatus to improve defense against a return-oriented-programming buffer overflow attack on a call stack, the apparatus comprising a processor and a memory storing instructions that, when executed by the processor, invoke transistor-based circuitry configured to:
in connection with a run-time call to a function:
obtain a control data bit sequence associated with a return from the call to the function;
obtain a substitute bit sequence different from the control data bit sequence;
cause the substitute bit sequence to be placed in the call stack and cause the control data bit sequence not to be placed in the call stack;
maintain an instantiation of the control data bit sequence in the memory at a location outside the call stack; and
maintain an instantiation of the substitute data bit sequence in the memory at a location outside the call stack;
in connection with a run-time return from the call to the function:
obtain the instantiation of the control data bit sequence from the memory at the location outside the call stack; and
before continuing operation of the computing apparatus according to the control data bit sequencer:
obtain the substitute bit sequence from the call stack;
obtain the instantiation of the substitute bit sequence from the memory at the location outside the call stack; and
obtain a verification of whether the substitute bit sequence from the call stack matches the instantiation of the substitute bit sequence from the memory at the location outside the call stack.

14. The security-enhanced computing apparatus of claim 13, wherein the obtaining a substitute bit sequence different from the control data bit sequence comprises generating the substitute bit sequence.

15. The security-enhanced computing apparatus of claim 13, wherein the obtaining a substitute bit sequence different from the control data bit sequence comprises obtaining a dummy address not associated with a return from the call to the function.

16. The security-enhanced computing apparatus of claim 15, wherein the obtaining a substitute bit sequence different from the control data bit sequence comprises obtaining a decoy address associated with invoking transistor-based circuitry configured to detect, track, misdirect, trap, and/or counteract an attacker.

17. The security-enhanced computing apparatus of claim 13, wherein the maintaining an instantiation of the control data bit sequence in the memory at a location outside the call stack further comprises encoding the control data bit sequence.

18. The security-enhanced computing apparatus of claim 17, wherein the encoding the control data bit sequence comprises encrypting the control data bit sequence.

19. The security-enhanced computing apparatus of claim 17, wherein the encoding the control data bit sequence comprises adding time-based entropy.

20. The security-enhanced computing apparatus of claim 13, wherein the obtaining the instantiation of the control data bit sequence from the memory at the location outside the call stack comprises decoding or decrypting the control data bit sequence.

21. The security-enhanced computing apparatus of claim 13, further comprising, if the verification determines that the substitute bit sequence from the call stack does not match the instantiation of the substitute bit sequence from the memory at the location outside the call stack, halt operation of the computing apparatus.

22. A security-enhanced computing apparatus to improve defense against a return-oriented-programming buffer overflow attack on a call stack, the apparatus comprising a processor and a memory storing instructions that, when executed by the processor, invoke transistor-based circuitry configured to:
  in connection with generation of a child process based on a parent process, wherein the child process includes a child process call stack based on a copying of a parent process call stack, and wherein the child process call stack includes a plurality of addresses where a first stack canary bit sequence is located:
    for each address of the plurality of addresses in the child process call stack where the first stack canary bit sequence is located:
      obtain a replacement bit sequence that differs from the first stack canary bit sequence;
      replace the stack canary in the child process call stack with a reinstantiated stack canary that includes the replacement bit sequence; and
      store the reinstantiated stack canary at a location in the memory outside the child process call stack; and
  in connection with a run-time return of a first function of the child process according to a first control data bit sequence protected by a first reinstantiated stack canary:
    compare the first reinstantiated stack canary from the child process call stack that includes the replacement bit sequence with a corresponding reinstantiated stack canary stored at the location in the memory outside the child process call stack; and
    condition return from the first function of the child process according to a result of the comparison to ensure that the first reinstantiated stack canary from the child process call stack that includes the replacement bit sequence and the first control data bit sequence have not been overwritten by an attack on the child process call stack.

23. The security-enhanced computing method of claim 22, further comprising intercepting the generation of the child process based on the parent process by at least one of: configuring a dynamic linker to preload a library having a function that is configured to override the generation of the child process; re-compiling a program or function; re-linking a program or function; or patching a compiled program or function binary.

24. The security-enhanced computing apparatus of claim 22, wherein the obtaining the replacement bit sequence that differs from the first stack canary bit sequence includes obtaining an at least pseudo-randomized bit value based at least in part on a source of entropy.

25. The security-enhanced computing apparatus of claim 22, wherein each reinstantiated stack canary differs from another reinstantiated stack canary or wherein the replacement bit sequences of the reinstantiated stack canaries each differ from each other.

26. The security-enhanced computing apparatus of claim 22, further comprising maintaining a collection of reinstantiated stack canaries and associated addresses in the child process call stack at a location in the memory outside the child process call stack.

27. The security-enhanced computing apparatus of claim 22, further comprising storing, in connection with the reinstantiated stack canary at a location in the memory outside the child process call stack, an address in the child process call stack that relates to where the first stack canary bit sequence is replaced with the reinstantiated stack canary.

28. The security-enhanced computing apparatus of claim 22, wherein the address is not stored in connection with the reinstantiated stack canary, and wherein the comparing the first reinstantiated stack canary from the child process call stack that includes the replacement bit sequence with a corresponding reinstantiated stack canary stored at the location in the memory outside the child process call stack comprises iterating through a series of reinstantiated stack canaries stored at the location in the memory outside the child process call stack until a match is found.

29. The security-enhanced computing apparatus of claim 22, further comprising obtaining a determination that the control data bit sequence is associated with a specific reinstantiated stack canary.

* * * * *